(12) United States Patent
Cole

(10) Patent No.: US 9,851,476 B2
(45) Date of Patent: Dec. 26, 2017

(54) CONTAINER ASSEMBLY

(71) Applicant: Traci Cole, Laguna Niguel, CA (US)

(72) Inventor: Traci Cole, Laguna Niguel, CA (US)

( * ) Notice: Subject to any disclaimer, the term of this patent is extended or adjusted under 35 U.S.C. 154(b) by 115 days.

(21) Appl. No.: 14/840,166

(22) Filed: Aug. 31, 2015

(65) Prior Publication Data

US 2017/0059747 A1 Mar. 2, 2017

(51) Int. Cl.

| | | |
|---|---|---|
| *G02B 3/08* | (2006.01) |
| *B65D 23/08* | (2006.01) |
| *B65D 51/24* | (2006.01) |
| *B65D 6/10* | (2006.01) |
| *B65D 81/32* | (2006.01) |
| *B65D 1/02* | (2006.01) |
| *G02B 25/00* | (2006.01) |
| *A45D 40/00* | (2006.01) |
| *A61J 1/03* | (2006.01) |
| *B65D 81/38* | (2006.01) |
| *G02B 3/00* | (2006.01) |

(52) U.S. Cl.
CPC .............. *G02B 3/08* (2013.01); *A45D 40/00* (2013.01); *A61J 1/03* (2013.01); *B65D 1/0215* (2013.01); *B65D 1/0223* (2013.01); *B65D 11/16* (2013.01); *B65D 23/0885* (2013.01); *B65D 51/24* (2013.01); *B65D 81/3227* (2013.01); *G02B 25/002* (2013.01); *B65D 81/3837* (2013.01); *G02B 2003/0093* (2013.01)

(58) Field of Classification Search
CPC  G02B 3/08; G02B 2003/0039; G02B 25/002; B65D 1/0207; B65D 1/0223; B65D 1/025; B65D 51/24; B65D 23/0885; B65D 11/16; B65D 81/3837; B65D 81/3227; B65D 81/3865; A45D 40/00; A61J 1/00; A61J 1/03; A61J 2205/30; A61J 2205/40; A47G 19/2288

USPC ......... 220/662, 665, 506, 703; 359/802, 440
See application file for complete search history.

(56) References Cited

U.S. PATENT DOCUMENTS

| | | | | |
|---|---|---|---|---|
| 933,444 | A | * | 9/1909 | Henke, Jr. ............. B65D 1/265 206/219 |
| D112,706 | S | | 9/1938 | Smith |
| D181,321 | S | | 10/1957 | Stowell |
| 3,810,557 | A | * | 5/1974 | Cline ................. A47G 19/2288 215/12.1 |
| 4,065,016 | A | * | 12/1977 | Perkins ................. B65D 11/04 215/6 |
| 4,372,453 | A | * | 2/1983 | Branscum .......... A47G 23/0266 215/12.2 |
| 4,509,641 | A | * | 4/1985 | Scieri ................. B65D 81/3222 206/219 |
| 4,762,224 | A | * | 8/1988 | Hall .................... B65D 43/0216 206/219 |
| 5,193,032 | A | | 3/1993 | Hirth |
| 5,204,775 | A | | 4/1993 | McDevitt |
| 5,309,279 | A | | 5/1994 | Halstead |
| 5,610,770 | A | | 3/1997 | Galiani |
| 5,662,239 | A | * | 9/1997 | Heuvelman ............... A61J 1/00 220/506 |

(Continued)

*Primary Examiner* — Jeffrey Allen
*Assistant Examiner* — Jennifer Castriotta

(57) ABSTRACT

A container assembly includes a bottle that may contain an object. A magnifying unit is positionable within the bottle. Thus, the magnifying unit may magnify the object contained within the bottle thereby facilitating the object to be seen.

5 Claims, 4 Drawing Sheets

(56) References Cited

U.S. PATENT DOCUMENTS

| | | | | |
|---|---|---|---|---|
| 6,085,543 | A * | 7/2000 | Su | A47G 19/2288 |
| | | | | 62/438 |
| 6,549,345 | B1 | 4/2003 | Cardarelli | |
| 6,621,629 | B2 | 9/2003 | Blumenthal et al. | |
| 6,962,264 | B2 * | 11/2005 | Zilberman | A47G 19/2227 |
| | | | | 220/662 |
| 7,021,489 | B2 | 4/2006 | Wilson | |
| 2009/0207498 | A1 | 8/2009 | Hauge | |
| 2010/0147844 | A1 * | 6/2010 | Connell | A47G 7/06 |
| | | | | 220/62.18 |
| 2012/0024863 | A1 * | 2/2012 | Cho | B65D 21/0204 |
| | | | | 220/506 |
| 2012/0243110 | A1 * | 9/2012 | Robinson | G02B 25/002 |
| | | | | 359/742 |
| 2012/0268838 | A1 * | 10/2012 | Rittenburg | B43K 29/003 |
| | | | | 359/802 |

\* cited by examiner

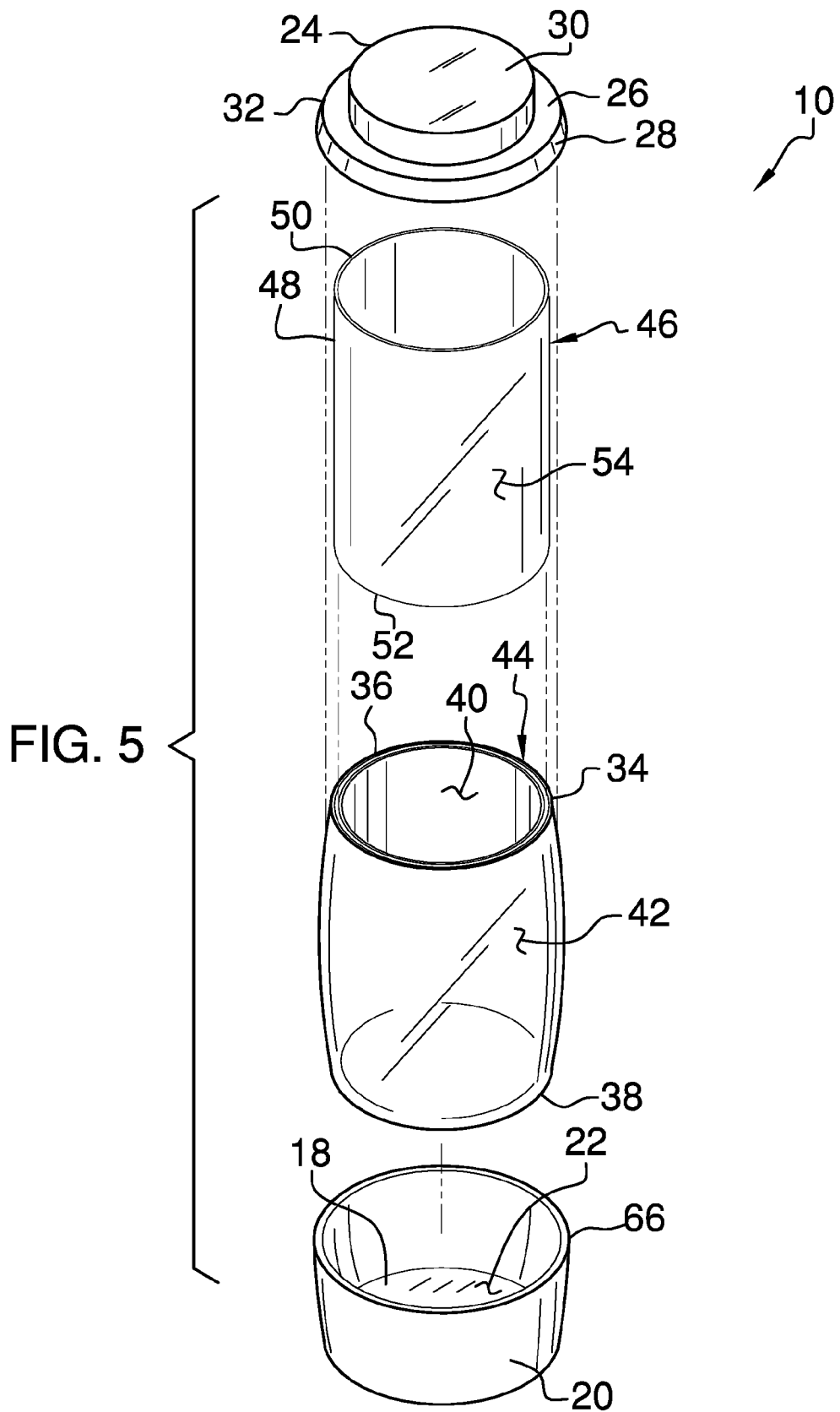

US 9,851,476 B2

CONTAINER ASSEMBLY

BACKGROUND OF THE DISCLOSURE

Field of the Disclosure

The disclosure relates to container devices and more particularly pertains to a new container device for magnifying an object container within a container.

SUMMARY OF THE DISCLOSURE

An embodiment of the disclosure meets the needs presented above by generally comprising a bottle that may contain an object. A magnifying unit is positionable within the bottle. Thus, the magnifying unit may magnify the object contained within the bottle thereby facilitating the object to be seen.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 5 is an exploded perspective view of an embodiment of the disclosure.

DESCRIPTION OF THE PREFERRED EMBODIMENT

Figure 1:
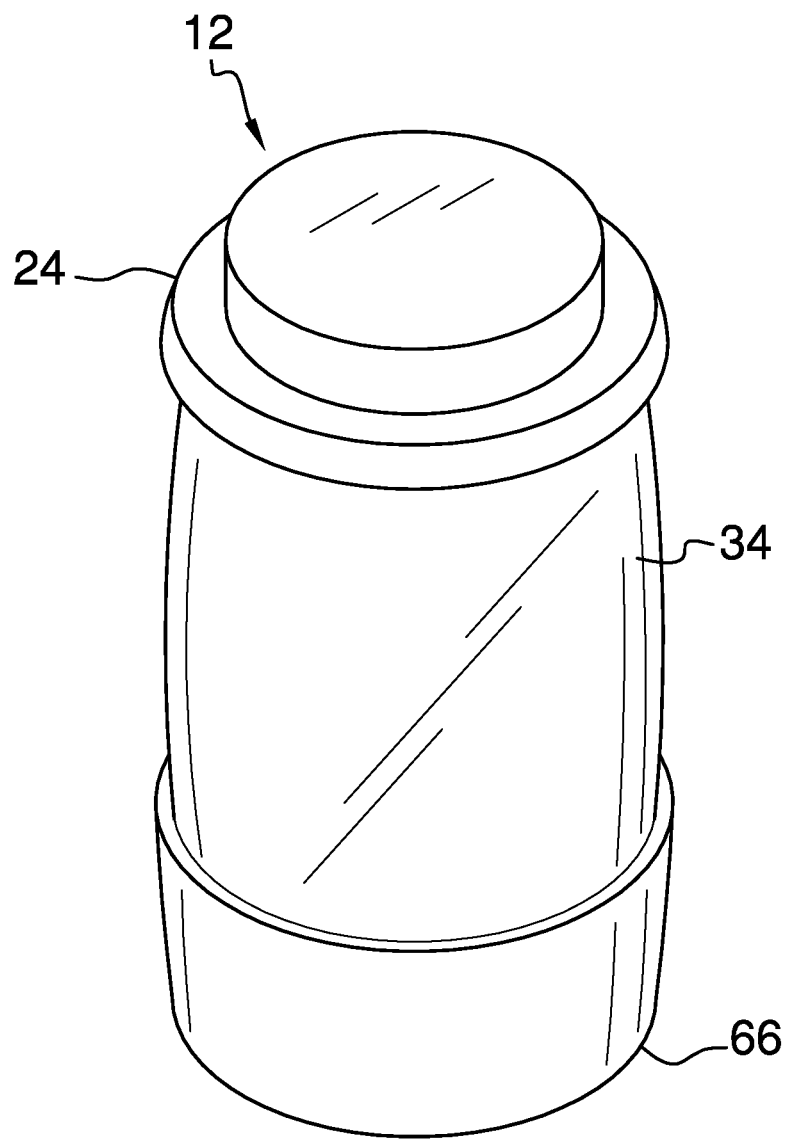
FIG. 1 is a perspective view of a container assembly according to an embodiment of the disclosure.
Figure 2:
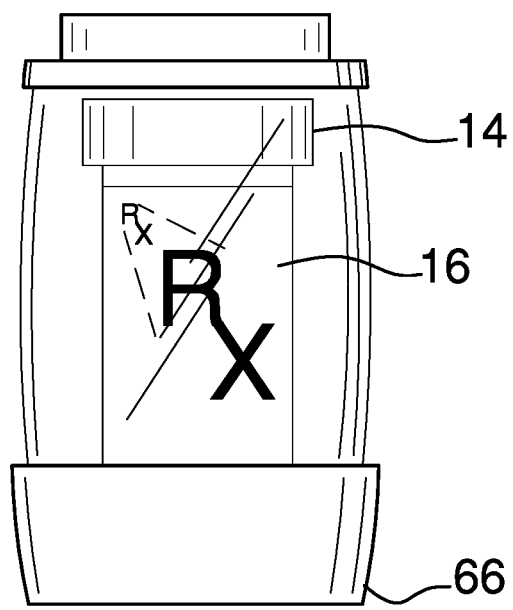
FIG. 2 is a right side view of an embodiment of the disclosure.
Figure 3:
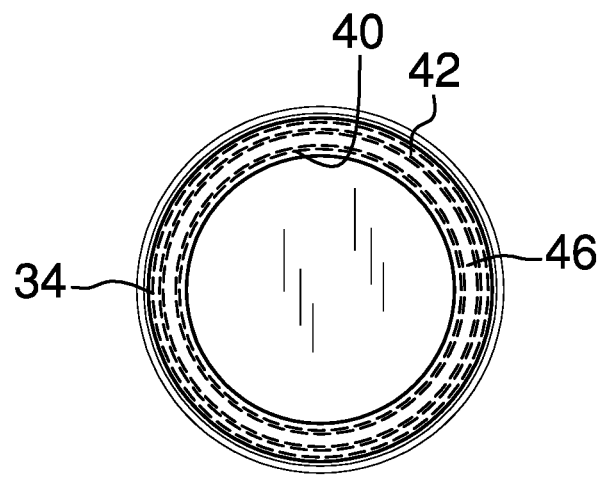
FIG. 3 is a top view of an embodiment of the disclosure.
Figure 4:
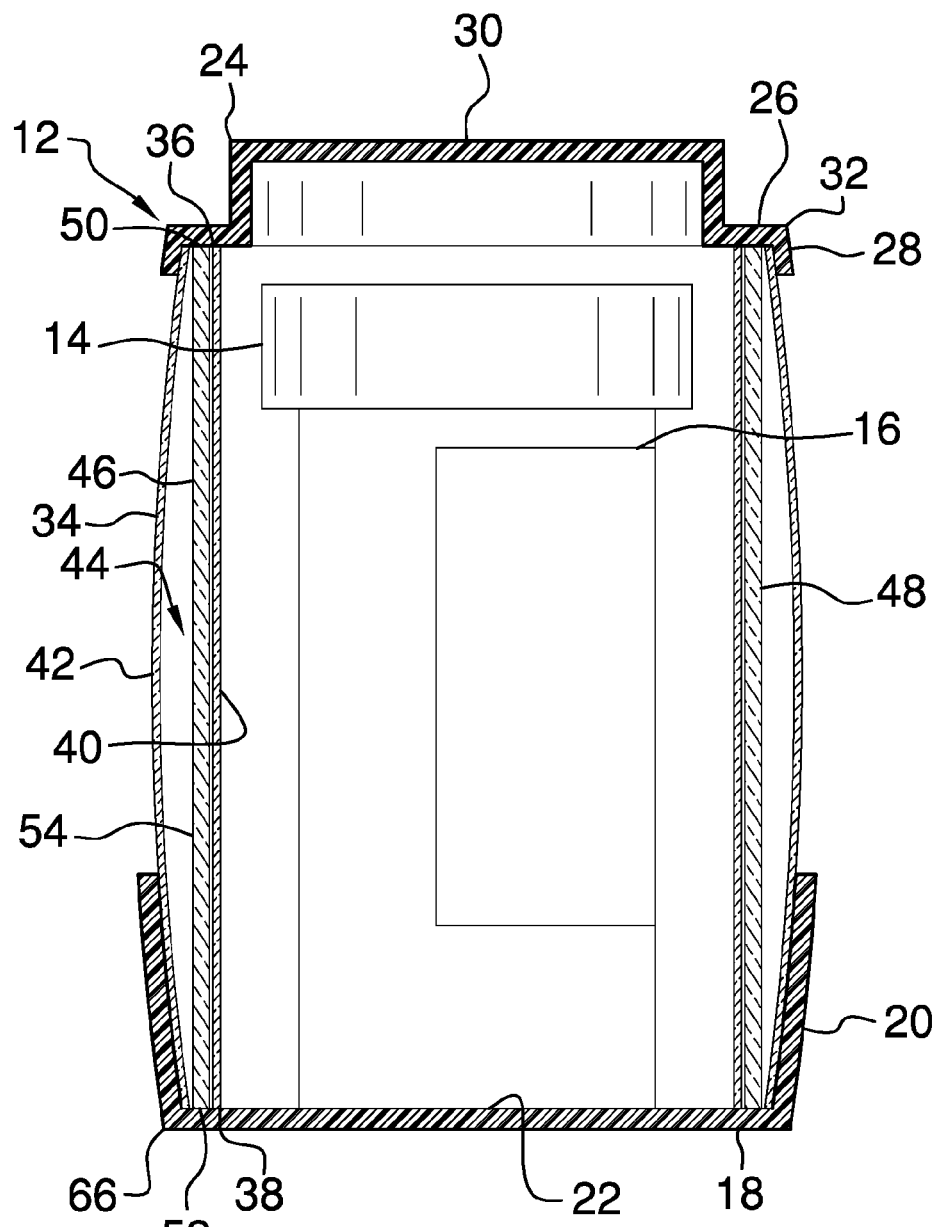
FIG. 4 is a right side cut-away view of an embodiment of the disclosure.

With reference now to the drawings, and in particular to FIGS. 1 through 5 thereof, a new container device embodying the principles and concepts of an embodiment of the disclosure and generally designated by the reference numeral 10 will be described.

As best illustrated in FIGS. 1 through 5, the container assembly 10 generally comprises a bottle 12 that may contain an object 14. The object 14 may comprise a medication bottle and the medication bottle may have a label 16. The bottle 12 comprises a base 66 that has a basal wall 18 and a peripheral wall 20 extending upwardly from the basal wall 18. The basal wall 18 has a top surface 22.

A lid 24 is provided that has a top wall 26 and a lip 28. The lid 24 has a raised portion 30 and an outer edge 32. The lip 28 is coextensive with the outer edge 32 and the raised portion 30 is centrally positioned on the top wall 26. Each of the base 66 and the lid 24 may be comprised of a resiliently deformable material such as silicone or the like.

A cylinder 34 is provided that has a top end 36, a bottom end 38, an inner surface 40 and an outer surface 42. Each of the top end 36 and the bottom end 38 are open thereby facilitating the cylinder 34 to removably contain the object 14. The inner surface 40 is spaced from the outer surface 42 to define a space 44 within the cylinder. The outer surface 42 curves outwardly between the top end 36 and the bottom end 38.

The cylinder 34 is removably positionable in the base 66 having the bottom end 38 abutting the top surface 22. The peripheral wall 20 frictionally engages the outer surface 42. The lid 24 is removably coupled to the top end 36. The lip 28 frictionally engages the outer surface 42. The cylinder 34 is comprised of a translucent material thereby facilitating the object 14 to be visible through the cylinder 34.

A magnifying unit 46 is positionable within the bottle 12. The magnifying unit 46 may magnify the object 14 contained within the bottle 12 thereby facilitating the object 14 to be seen. The magnifying unit 46 comprises a tube 48 that has a first end 50, a second end 52 and an exterior surface 54 extending between the first end 50 and the second end 52. The tube 48 is insertable into the space 44 such that the exterior surface 54 is positioned between the inner surface 40 and the outer surface 42. The tube 48 is comprised of an image magnifying material. The tube 48 may comprise a Fresnel lens or the like.

In use, the cylinder 34 is positioned within the base 66. The tube 48 is positioned within the space 44. The object 14 is placed within the cylinder 34 and the lid 24 is positioned on the cylinder 34. The tube 48 magnifies the label 16 on the medication bottle thereby facilitating the label 16 to be read. The lid 24 is removed and the object 14 is removed from the cylinder 34.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A container assembly configured to visually magnify an object, said assembly comprising:
   a bottle configured to contain an object;
   a magnifying unit being positionable within said bottle wherein said magnifying unit is configured to magnify the object contained within said bottle thereby facilitating the object to be seen, said magnifying unit comprising a tube having a first end, a second end and an exterior surface extending between said first end and said second end, said tube being comprised of an image magnifying material; and a cylinder having a top end, a bottom end, an inner surface and an outer surface, each of said top end and said bottom end being open wherein said cylinder is configured to removably contain the object, said inner surface being spaced from said outer surface to define a space within said cylinder, said outer surface curving outwardly between said top end and said bottom end, said tube being insertable into said space such that said exterior surface is positioned between said inner surface and said outer surface.

2. The assembly according to claim 1, wherein said bottle comprises a base having a basal wall and a peripheral wall extending upwardly from said basal wall, said basal wall having a top surface.

3. The assembly according to claim 1, further comprising a lid having a top wall and a lip, said lid having a raised portion and an outer edge, said lip being coextensive with said outer edge, said raised portion being centrally positioned on said top wall.

4. The assembly according to claim 1, wherein:
said bottle includes a base and a lid, said base having a top surface; and
said cylinder is removably positionable in said base having said bottom end abutting said top surface, said lid being removably coupled to said top end, said cylinder being comprised of a translucent material thereby facilitating the object to be visible through said cylinder.

5. A container assembly configured to visually magnify an object, said assembly comprising:

a bottle configured to contain an object, said bottle comprising:
  a base having a basal wall and a peripheral wall extending upwardly from said basal wall, said basal wall having a top surface,
  a lid having a top wall and a lip, said lid having a raised portion and an outer edge, said lip being coextensive with said outer edge, said raised portion being centrally positioned on said top wall, and
  a cylinder having a top end, a bottom end, an inner surface and an outer surface, each of said top end and said bottom end being open wherein said cylinder is configured to removably contain the object, said inner surface being spaced from said outer surface to define a space within said cylinder, said outer surface curving outwardly between said top end and said bottom end, said cylinder being removably positionable in said base having said bottom end abutting said top surface, said lid being removably coupled to said top end, said cylinder being comprised of a translucent material thereby facilitating the object to be visible through said cylinder; and a magnifying unit being positionable within said bottle wherein said magnifying unit is configured to magnify the object contained within said bottle thereby facilitating the object to be seen, said magnifying unit comprising a tube having a first end, a second end and an exterior surface extending between said first end and said second end, said tube being insertable into said space such that said exterior surface is positioned between said inner surface and said outer surface, said tube being comprised of an image magnifying material.

\* \* \* \* \*